United States Patent Office 3,531,912
Patented Oct. 6, 1970

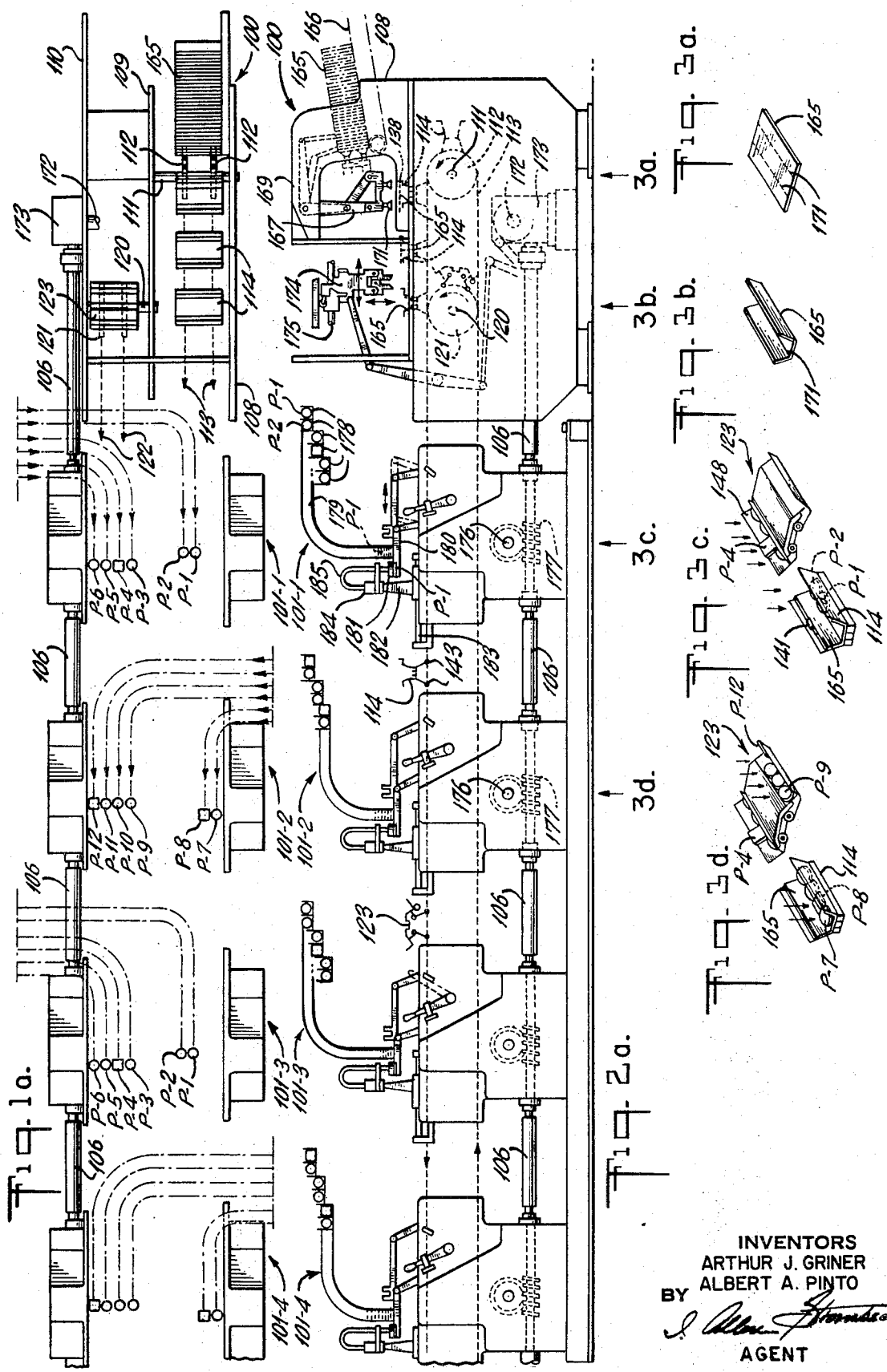

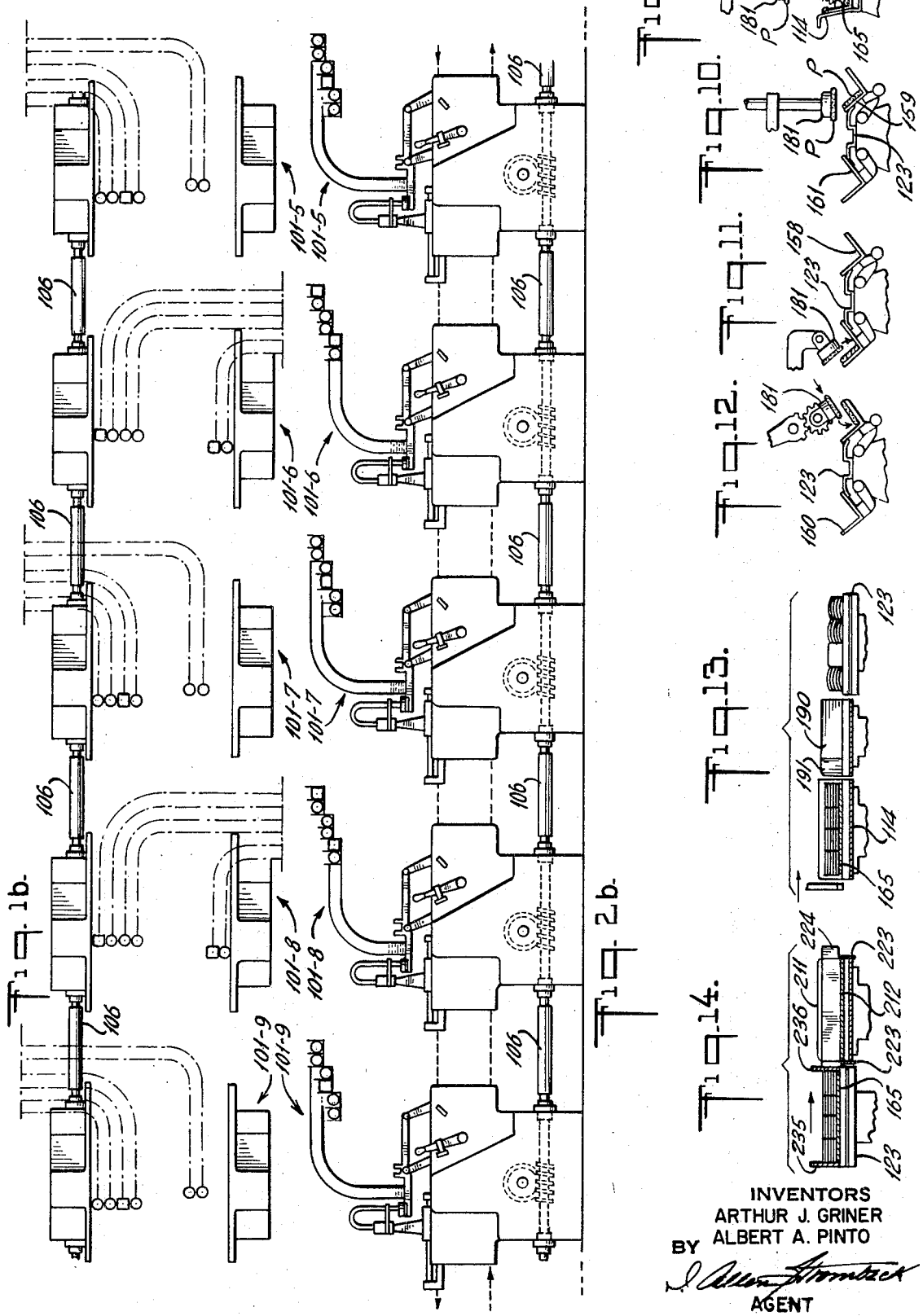

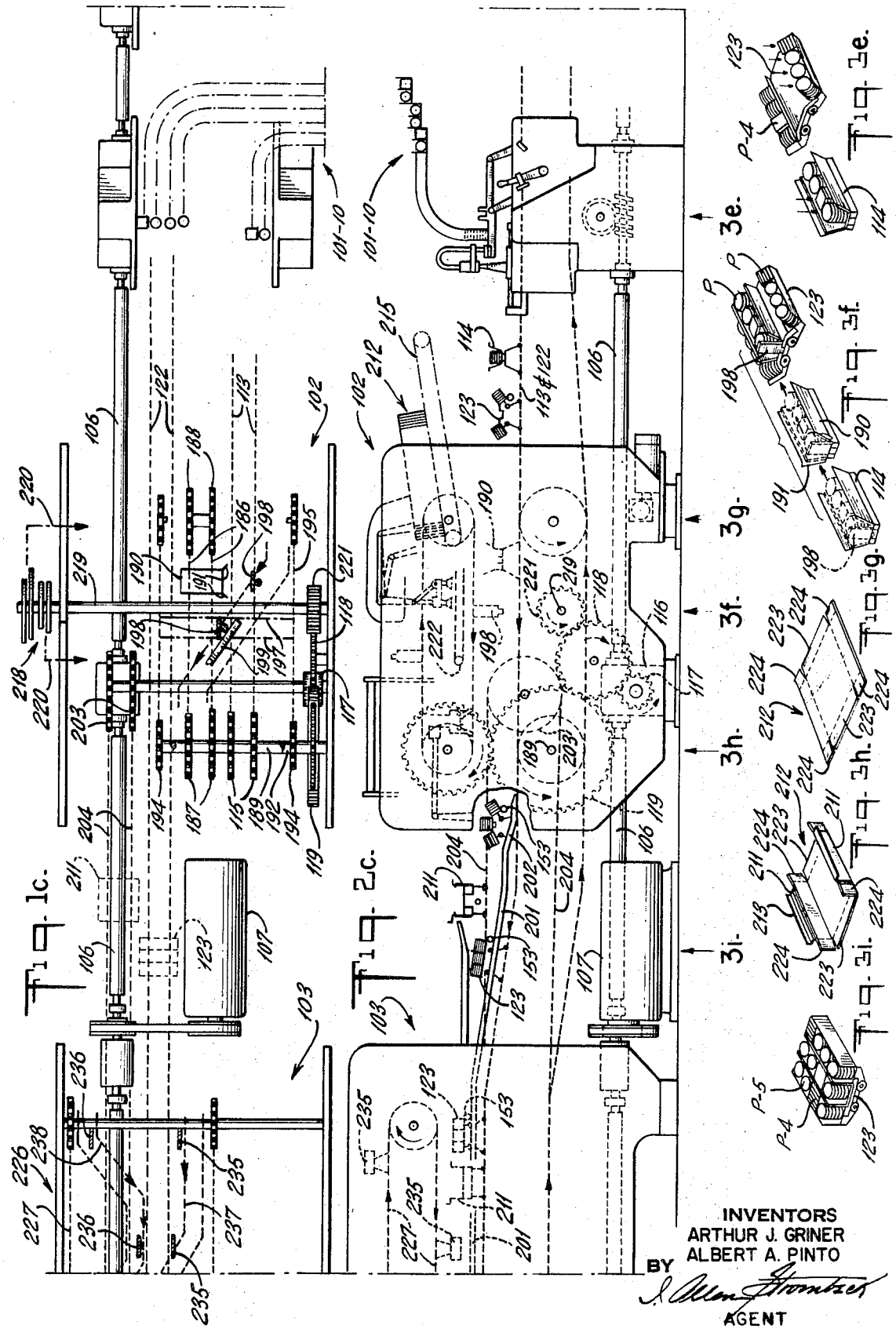

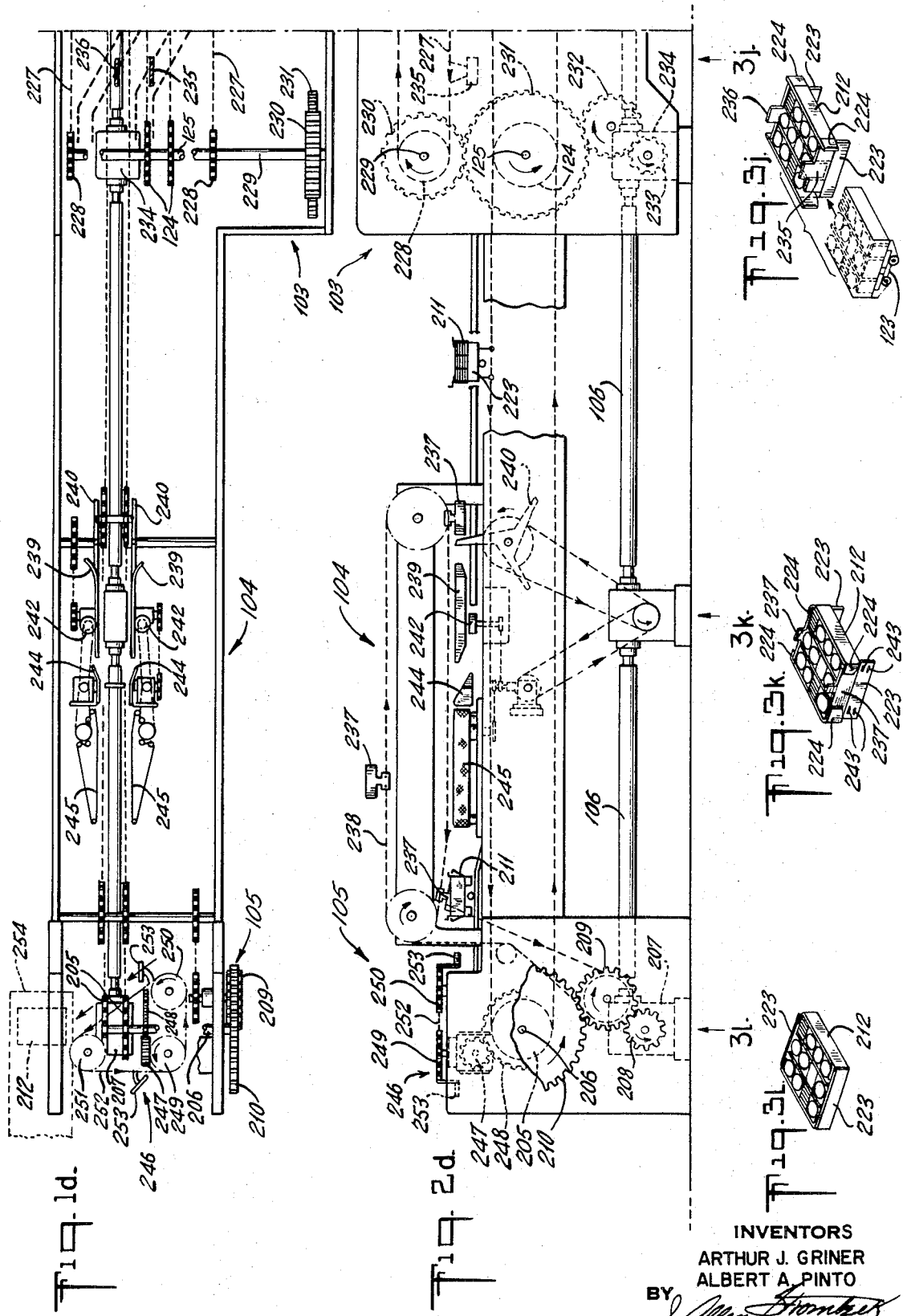

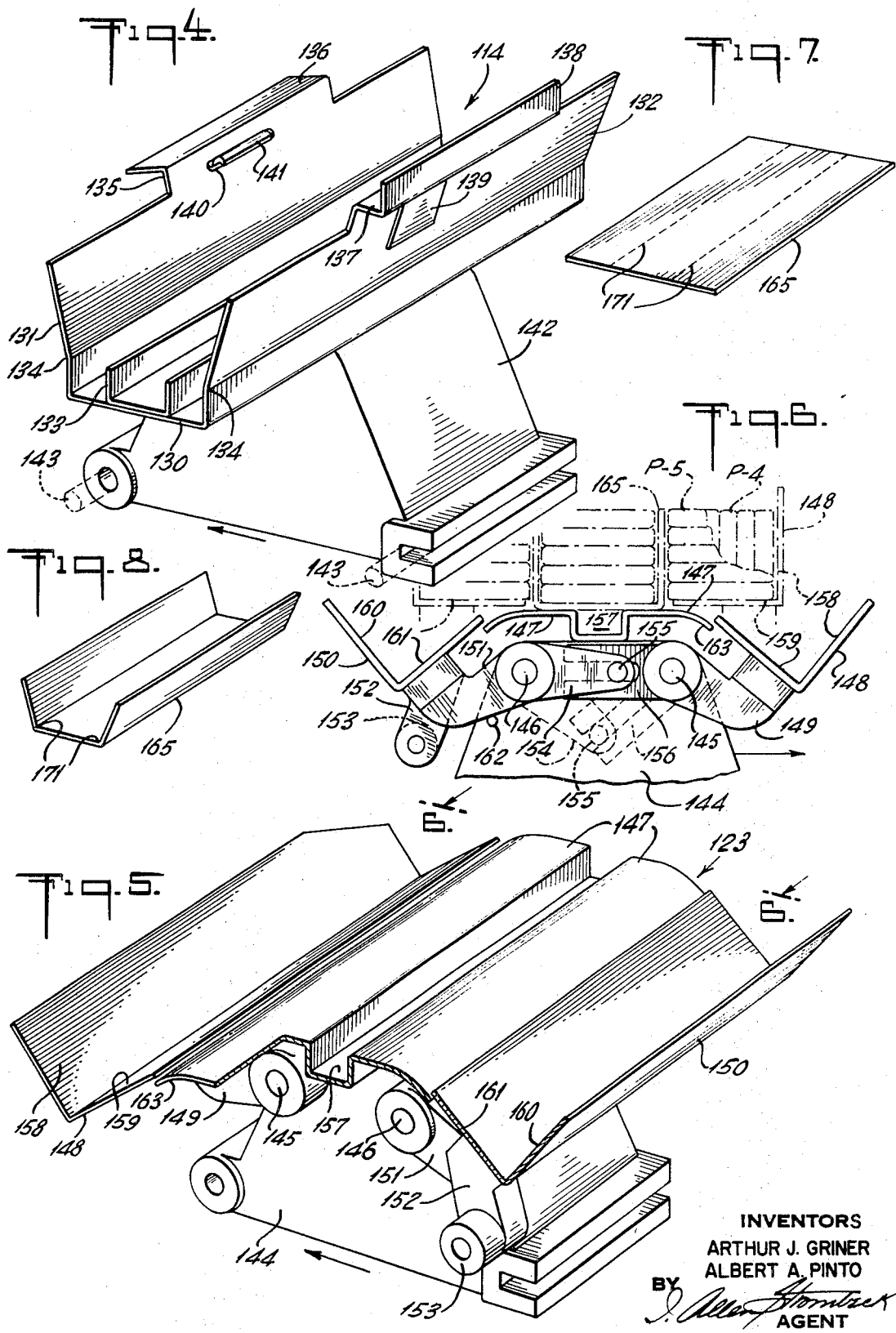

3,531,912
ASSORTMENT ASSEMBLING APPARATUS
Arthur J. Griner, Wyckoff, N.J., and Albert A. Pinto, White Plains, N.Y., assignors to National Biscuit Company, a corporation of New Jersey
Filed May 23, 1968, Ser. No. 731,435
Int. Cl. B65b 35/38, 35/54, 35/56
U.S. Cl. 53—156                                9 Claims

ABSTRACT OF THE DISCLOSURE

A conveyor system moves trough-shaped inner carton liners and laterally aligned hinged receiver buckets continuously in parallel registry through a series of feeding units, each unit being adapted to deposit a number of selected differing food articles, such as wafers, cookies, etc., simultaneously in each liner and its related hinged bucket. The successive feeding units build up a transverse central row of product stacks in the liner and side rows of stacks in the accompanying hinged bucket. Certain adjacent stacks are piled at differing angles, affording mutual support against side slip. When the stacking is complete, the loaded liner is transferred to the hinged bucket, the side rows of product stacks are swung against the outer sides of the liner, and the assembly is moved bodily into an outer carton tray. The loaded tray is end sealed and discharged to final wrapping apparatus.

---

The present invention pertains to improvements in assortment assembling apparatus, being principally directed to means for rapidly assembling a variety of generally similar food articles such as wafers, cookies and the like, in a common container, in predetermined selective quantities and arrangement.

In the market for baked food articles such as cookies, wafers and the like, a popular demand calls for the furnishing of such articles in the form of an assortment of varieties in multiple quantities, conveniently packaged in a single container or tray carton. A typical form consists of ten varieties of articles disposed in stacks of four or five articles per stack. However, certain factors have hitherto prevented the successful application of modern high speed completely automatic assembly methods to such assortments, these factors being principally the fragility of the products, the relatively large number of articles involved, and the desired arrangement of the product in the tray. As a prime example, in the preferred form of assortment certain articles are stacked on edge rather than flatwise, affording transverse stability among the stacks during assembly and facilitating the initial removal of the articles by the customer; this arrangement has hitherto been accomplished by hand labor, in the absence of any practical automatic means, with resulting low production rate and high cost. The lack hitherto of such suitable means is illustrated by reference to the following listed U.S. patents, which are believed to constitute the best available prior art:

3,191,358—Scherr et al.
3,191,749—Hawley et al.
3,319,396—Hofer et al.
3,279,147—Garapolo
3,191,751—Griner The first three listed patents, namely those of Scherr, Hawley and Hofer, deal with the assorting art, in that they are directed to the depositing of various confections such as chocolates, one by one, in candy boxes. Their modes of operation and necessary apparatus, either as disclosed or by any practical or theoretical alteration within their scope and intent, render them unable to carry out the functions of the present invention. The reasons for the various deficiencies in these and the other listed devices of the prior art will appear specifically in the descriptive course of the present application; hence, as a preliminary measure it is appropriate at this point to set forth the nature and limitations of the listed individual prior patents as follows:

Scherr discloses a machine for automatically placing various differing candies in individual paper cups and depositing them in a predetermined orientation pattern within a common box. The boxes to be loaded are carried on a conveyor through a series of depositing or feeding stations. The apparatus necessary to carry out the disclosed feeding operation is such that only one individual candy can be fed per station, irrespective of the number of different varieties; i.e., the number of stations is governed directly by the total number of individual pieces rather than the number of types involved. Thus, for example, if Scherr's apparatus is designed to deposit a layer of fifty candy units in a box, even if the number of different types of candies in the assortment is only ten, he must nevertheless provide fifty complete depositing stations. If two layers of twenty-five were to be deposited, the fifty stations still would be required. Furthermore, aside from the large multiplicity of complicated units, Scherr's individual delivery apparatus, which is a principal feature of his invention, involves mechanical side jaws and a mechanical plunger, which cooperatively grasp the article edgewise and thrust it downward through an expanding funnel into the box. While such apparatus can be assumed to operate successfully on such relatively rugged articles as candies protected by paper cups, any attempt to apply it to such highly fragile articles as brittle wafers, cookies and the like, would obviously result in so much breakage as to render the device useless for this purpose.

The patent to Hawley et al., which has common ownership with the above noted patent to Scherr et al., is auxiliary to the latter in that it covers a specific type of rotary feeders intended to line up the candy articles for input to each depositing unit of Scherr. Since the particular means of initial in-feeding to the production line is not per se a part of the present invention, the Hawley patent is of interest only in its further illustration of the assorting art in the above relation to Scherr.

The patent to Hofer et al. discloses a depositing means for dropping a particular candy unit at a particular spot in a candy box, being in this sense a variation of the depositing means of Hawley; the principal differences are that Hofer's device relies on gravity alone to drop candies through a template and that the candy box must be held stationary while the deposit is made, the stoppage of course slowing the production rate. In common with Hawley, Hofer obviously can deposit only one individual candy per station, necessitating a complete depositing station for each individual article in the final assembly, regardless of the number of different types called for in the assortment.

The Garapolo patent is listed as of interest because it illustrates the state of the prior art involving the use of carriers to deliver groups of food articles to wrapping apparatus, such use per se of course being well known. Except in the above narrowly limited sense, nothing disclosed by Garapolo bears any significant relation to the present invention. His device is directed solely to the packing of meat products, specifically frankfurters, which are well known to be rugged articles by no means requiring delicacy in handling. In fact, a principal feature of Garapolo's invention is the use of a pressure plate to squeeze the frankfurters of a particular group into properly assembled relation; to attempt to apply such a system to fragile wafers, cookies and the like, would obviously result in destructive failure. Furthermore, Garapolo's device provides neither continuous high speed nor truly automatic operation, as his conveyor must be moved intermittently and the feed of articles into each carrier must be accomplished directly by hand labor.

The Pat. 3,191,751 to Griner has common ownership with the present application by assignment. While this patent does not anticipate the prime purposes or salient features of the present invention either by disclosure or suggestion, it lies within the pertinent field of baked product handling apparatus, and hence contains some structures which may optionally be employed as auxiliary to the present new and useful conceptional combination. Briefly stated, the said Griner device forms small flat assemblies of articles such as cookie sandwiches for use as individual servings in restaurants and lunch counters, the typical assembly product including four sandwiches packaged in two stacks of two sandwiches each. To accomplish this object, the machine employs a central and two flanking rows of conveyor buckets, the bottoms of the flanking buckets being at a higher level than that of the central buckets. Product units are fed singly at spaced intervals into the various bucket trains. Rotary pin wheels transfer units singly from the flanking buckets to the central buckets on top of single units therein, thus forming a single row of two-high stacks. The row of stacks is shifted laterally, and separated into groups of two-in-line stacks for feeding to the wrapping apparatus. While this device is well adapted to its particular stated purpose, namely the production of small flat packets for individual servings, it is obviously not adapted or feasibly adaptable to the production of the large assortments previously noted as being in present demand. To illustrate, it is sufficient to cite the typical example of the desired assortment including sixty units assembled in twelve stacks of five and arranged in three transverse rows of four stacks each. The two-high stacking provided by the prior Griner device, as noted above, calls for transverse feed of single units from the two flanking bucket trains to the single central train. If it were contemplated to apply this system of transverse stacking to the building of five-high instead of two-high stacks, four pairs of flanking bucket trains would be required, all operating at different levels and each supplied with its own in-feeding means and cross-feed wheels; the net result of this complication would still be only a single longitudinal line of stacks. To provide an assembly including transverse rows of four stacks per row, four such complete stacking systems would be necessary, calling for at least thirty-six primary trains of buckets, and due among other mechanical factors to the lateral extent of the cross feed wheels, the emerging four rows of stacks would be relatively far apart. The consequent necessity of accurately combining selected three-stack segments from the widely spaced four rows to snugly assembled multi-row packs would call for wide range multi-station cross transfer apparatus well beyond the disclosed or suggested capabilities of the said Griner device. It is believed obvious that such an attempted build-up of the individual cross-stacking system would result, in points of extreme complication, servicing difficulty and spatial requirements, in what would become a mechanical absurdity. Clearly, nothing disclosed by the previously noted candy assorters and frankfurter assembler patents could alleviate this condition.

It may also be noted that with regard to the assembly of differing products in assortments of individual product stacks, to accomplish such individual product stacking with the enlarged cross stacking combination theoretically cited above, it would be necessary to pre-assort the product species one by one in at least some of the initial infeed chutes, since each flanging bucket train feeds successive central buckets. Finally, it will be noted that the prior art does not provide any means to include two important features of the product assortments set forth herein, namely, (1) interior liner partitions between lateral stack rows, and (2) right angular or crisscross stacking plane assembly relation of certain adjacent stacks, which relation, as previously mentioned, promotes accurate assembly, stability in subsequent handling and convenient initial removal by the user.

The foregoing discussion of the prior art has been carried out at some length, not in any derogation of the effectiveness of the prior devices within their own particular scopes, but rather as appropriate to illustrate clearly why the automatic high speed production of the desired multi-product packs has not been attainable prior to the present invention.

In view of the above, an object of the present invention is to provide means for direct building up of a plurality of product stacks in close mutual relation to form a compact lateral row of stacks.

A further object is to provide apparatus of the above nature including a succession of product feeding stations and conveyor means for carrying a series of stack receivers or buckets continuously through the successive feeding stations, each of the buckets being adapted to contain at least one multi-stack row of products.

A further object is to provide apparatus of the above type in which the conveyor means carries two longitudinally parallel trains of multi-stack buckets arranged in cooperatively aligned pairs, the two buckets of each pair being adapted in cooperation to receive and contain the total number of product stacks called for in the desired final pack or assortment.

A further object is to provide apparatus of the above nature in which each bucket of the first series or train is adapted to collect a single transverse row of stacks while its corresponding bucket of the second train collects rows of stacks longitudinally spaced by a central zone laterally aligned with the row of stacks in the first bucket, and including lateral transfer means to shift the first row of stacks bodily from the first bucket into the central zone of the second bucket.

A further object is to provide apparatus of the type noted in which the second bucket of each pair is formed with leading and trailing angularly bent walls hinged or articulated with respect to the central zone portion and normally swung down to form upwardly open V-shaped troughs for accumulating the stack rows of products fed thereto, and including means to swing the hinged troughs upward to erect their stack rows into assembly relation with the row of stacks previously transferred to the central zone of the second bucket, thereby forming a triple-row stack assembly in each bucket of the second train or series.

Another object is initially to provide each bucket of the first train with a trough shaped liner adapted to contain the central stack row throughout the latter's accumulation and subsequent bodily transfer to the respective second bucket, by which means the liner provides stabilizing partitions between the central and outer rows of the final triple-row assembly, as well as support for the central row during its lateral transfer.

A further object is to provide an intermediate train of conveyed guide trough each adapted to place and maintain a central stack row and its liner unit in closely accurate alignment with the corresponding bucket of the second train during transfer thereto.

Another object is to provide means in the feeding units to effect the build-up of adjacent stacks in differing or crisscross stacking plane relation.

A further object, particularly in view of the fragile nature of various product units concerned is to provide the feeding units with vacuum gripping means to effect gentle but accurate deposit of product units.

A further object is to provide means to supply normally open ended outer container trays conveyed in lateral alignment each to each with the triple-row product assemblies, means to load the assemblers bodily into their respective trays, and means to discharge the loaded trays to final wrapping apparatus.

Further associated objects and advantages of the invention will become evident during the course of the following description in connection with the accompanying drawings, in which FIGS. 1a, 1b, 1c and 1d together constitute a semi-diagrammatic plan view of the assembly line apparatus in typical preferred form;

FIGS. 2a, 2b, 2c and 2d similarly present the apparatus in near or front-side elevation;

FIGS. 3a, 3b, 3c, 3d, 3e, 3f and 3g–3l are perspective detail views illustrating the progressive steps in the assembling process at the points correspondingly indicated in FIGS. 2a, 2c and 2d;

FIG. 4 is a perspective detail view of a typical series one or middle row accumulating bucket;

FIG. 5 is a similar view of a typical series two or outer row accumulating bucket;

FIG. 6 is a rear view of the same in the plane 6—6, FIG. 5, illustrating the collapsing features of the typical series two bucket;

FIG. 7 shows a typical scored liner blank;

FIG. 8 shows the shape of the liner after its installation in the typical series one bucket;

FIG. 9 is a fragmental operational view illustrating the perpendicular deposit of articles in the series one buckets;

FIG. 10 is a similar view illustrating the angular deposit of a food article on the outer or leading slope of the series two bucket;

FIG. 11 is a similar view showing the angular deposit of a food article on the outer or leading slope of the series two bucket;

FIG. 12 similarly shows the angular deposit on the trailing slope of the series two bucket;

FIG. 13 is a fragmental transverse view showing the alignment of each pair of the loaded series one and two buckets, together with their intermediate trough, at the start of transverse assembly, and FIG. 14 similarly illustrates the alignment of the product assembly with the main container tray for final transverse delivery thereto.

In the interest of orderly description, the successive structural stages will just be generally defined in terms of their operational functions:

Referring to FIGS. 1a and 2a, the numeral 100 generally denotes the first operational section subassembly of the production line, including the operational starting points of the first and second bucket series conveyors, together with means to deposit liners in the series one buckets.

Similarly, the basic numeral 101 generally defines the second principal operational stage, i.e., the product feeding and stacking stage. In the present embodiment this stage includes ten generally similar feeding units. Hence, for simplicity in their subsequent description these units are successively denoted 101–1, 101–2, etc.—through 101–10; the series of feeding units extending through FIGS. 1b and 2b, and terminating with unit 101–10 in FIGS. 1c and 2c.

Following unit 101–10, FIGS. 1c and 2c, the processing line next includes a first transverse assembly section 102, wherein the middle row of product is transferred, together with its liner, from the series one bucket to its corresponding series two bucket between the two rows of stacks previously deposited in the latter by the feeding units. Section 102 also includes means to install final carton trays or containers for the assembled product articles.

Section 103, FIGS. 1c, 2c, 1d and 2d includes transverse pusher means to transfer the product assembly to the final container tray.

Section 104, FIGS. 1d and 2d, receives the loaded tray, closes and seals the ends thereof. Section 105 discharges the loaded and sealed assembly to any desired receiving means, such as a final wrapping machine.

In the preferred embodiment shown herein, all the operational stations are driven from a common line shaft 106, actuated by a suitable gear motor 107, FIGS. 1c and 2c. Due to the relatively large linear extent of the machine, and the unitary structures of the various station units, the drive shaft is made up of numerous sections joined in the usual manner by suitable couplings and sleeves; however, since such joining devices are well known in the mechanical arts and need no individual description, the drive shaft means will be collectively designated and referred to hereinafter simply as the line shaft 106.

LINER DEPOSIT STATION 100

Referring to FIG. 1a, the numerals 108, 109 and 110 respectively designate front, middle and rear frame plates, these designations being taken in accordance with the side elevational view, FIG. 2a, i.e., with the operation of the production line being directed from right to left. A cross shaft 111 carries a pair of sprockets 112 on which are mounted parallel conveyor chains 113. These chains in turn carry as spaced flights a succession of buckets 114, hereinafter described in detail, which make up the previously mentioned number one bucket train or series. The chains 113, with their attached buckets 114, extend through the multiple feed stations 101–1, etc., to sprockets 115, FIG. 1c, in the first transverse assembling section 102, the latter sprockets being provided with power drive from the line shaft 106 via a worm gear unit 116 and spur gears 117, 118 and 119, FIG. 2c.

Returning to FIGS. 1a and 1b, a second cross shaft 120 carries a second pair of sprockets 121 on which run chains 122 carrying spaced articulated or collapsible buckets 123 forming the number two bucket train previously mentioned. The chains 122, together with their attached buckets 123, extend throughout the multiple feed sections 101, the first transverse assembly section or station 102, thence into the second transverse assembly section 103, FIGS. 1c–d and 2c–d. These chains 122 engage sprockets 124 on a shaft 125, FIGS. 1d and 2d, this shaft being driven from the shaft 106 through wormgear unit 234 and spur gears 231, 232 and 233, FIG. 2d.

The buckets 114 of the number one series are constructed as typically illustrated in FIG. 4. The bucket proper is shaped as an open ended trough having a flat bottom 130 and leading and trailing walls 131 and 132 respectively, these walls being flared slightly outward as shown. A central channel member 133 is secured to the bottom portion 130, its sides extending upward approximately to the level of the "breaks" 134 of the flared walls 131 and 132. The leading wall 131 is formed with an upward extension 135 which is bent angularly forward to provide a small platform or pad 136. The trailing wall 132 is similarly provided with a platform 137, but the latter also has an upwardly directed rear extension 138 which acts as a driver to locate the liner blank properly on the bucket, as hereinafter set forth. Hook tabs 139 are secured on the outer surfaces of the bucket walls 131 and 132 with their angular upper portions intruding through slots 140 to form downwardly directed detents 141 within the bucket. Each bucket 114 is secured on a central support 142 mounted on spaced flight rods 143 which are carried by the two conveyor chains 113 in the usual manner.

Referring to FIGS. 5 and 6, the numeral 144 designates a base or support similar to the above described support 142 except that it has mounted in its upper corners a pair of transverse hinge rods 145 and 146. The bucket 123 proper consists of a middle portion 147 rigidly secured to the support 144, a leading side member 148 mounted by means of a suitable wide bracket structure 149 on the hinge rod 145, and a trailing side portion 150 similarly mounted by bracket structure 151 on the rod 146. The bracket 151 has formed or secured thereon a short downwardly depending arm 152 provided with a roller 153. Referring to rear view FIG. 6, it will be seen that the structure of the trailing bracket 151 also includes an inwardly directed arm 154 holding a pin 155 which engages a fork 156, this fork forming a part of the leading bracket structure 149. This interlocking ensures that the two bucket side portions 148 and 150 move in unison when swung about their respective hinge rods, as hereinafter described.

The middle portion 147 of the bucket 123 is formed with a central channel 157 similar to that provided by the member 133, FIG. 4. The leading side portion 148 of the bucket 123 is in the form of a V-shaped trough having outer and inner interior slopes 158 and 159 respectively, the included angle between the slopes being substantially 90 degrees. The trailing portion 150 is similarly formed with outer and inner slopes 160 and 161. In their normal or open position as shown in FIG. 5 and in full lines in FIG. 6, the side portions or V-troughs open directly upward, this position being determined by a stop pin 162. The outer edges 163 of the middle portion 147 are curved downward so that the side portions may closely over-ride them when the bucket is closed, as illustrated in broken lines, FIG. 6.

LINER INSTALLATION SECTION

The station 100, representing the starting point of the assembly line, FIGS. 1a and 2a, includes two operational sub-combinations in addition to the previously described mountings of the conveyor chain systems 113 and 122. The first sub-combination starts with a magazine 164 in which a supply of liner blanks 165 is stacked edgewise on a downwardly inclined belt conveyor 166, the left-hand or leading face of the liner stack being normally restrained at its edges by the usual small narrow side tabs (not shown, in view of the necessarily high scale reduction). A compounded lever pick-off mechanism 167 is mounted on an oscillatory cross rod 168 supported in a forward extension 169 of the frame plates 108 and 109. The mechanism 167 carries a plurality of suction cups 170 which are normally directed downward, but when the mechanism is swung counter clockwise, are orientated to engage and grasp the leading blank 165 of the stack thereof on the magazine belt 166, as indicated in dot and dash lines. Upon the clockwise return swing of the mechanism 167 the cups spring the blank 165 free of the previously noted magazine stack retaining tabs and drop the blank vertically in the path of the upward driving extension 138 on a moving series one bucket 114; the extension 138 drives the blank forward and aligns it on the platforms 136 and 137 (FIG. 4) of the bucket. As indicated in FIGS. 3a and 7, the blank 165 as furnished, has scores or linear indentations 171 to define the hinge lines in subsequent forming. The above described motions of the pick-off mechanism are derived via suitable linkage from a transverse camshaft 172 which is driven through a worm-gear unit 173 by the line shaft 106; since the various ways in which cams and associated parts may be constructed to produce any desired end motions are well known throughout the mechanical arts, the interests of clarity and brevity in description are properly served herein by definition of such combinations simply in terms of the end results themselves.

The second sub-combination in the station or section 100 comprises a ram mechanism 174, controllable by rotation of the camshaft 172 to move vertically and at the same time sliding longitudinally on guide rods 175. As a bucket 114, carrying a flat blank 165 placed thereon as previously noted, underrides the ram 174 the latter is moved forward in unison with the bucket and at the same time moves downward, thrusting and "breaking" the blank downward into the bucket, so that the blank 165 assumes the trough shape shown in FIGS. 3b and 8. The stroke of the ram carries the upper edges of the liner 165 slightly below the detents 141 (FIGS. 4 and 3c) so that the liner sides spring outward and are retained by the detents as the ram is retracted upward, leaving the liner snugly ensconced in the moving bucket.

FEEDER SECTION

The ten feeder or stacking units 101–1, 101–2, etc., are substantially identical in structure except for certain differences in positions of their final depositing cups and related parts as hereinafter set forth; these differences will be illustrated by comparative examination of units 101–1 and 101–2, FIGS. 1a and 2a. Each of the units throughout the train is equipped with its own operating camshaft 176 driven by a worm-gear unit 177 from the line shaft 106. With reference typically to the unit 101–1, FIGS. 1a and 2a, the supply of the various product articles P–1, P–2, etc. to the unit is provided by a plurality of input loaders 178 of any suitable type such as those shown in the previously noted co-owned Griner Pat. 3,191,751, which in operation maintain columns of the articles at the downwardly directed terminal portions of curved chutes 179, as exemplified in the case of the articles P–1, FIG. 2a.

In the present embodiment each feeding unit includes six individual columns, four being approximately aligned in a single transverse row above the path of the hinged buckets 123, being four in number they span substantially the entire width of these buckets. It will be noted that in unit 101–1 the row of four columns is spaced forwardly of the columns P–1 and P–2 in the production line direction, for reasons hereinafter explained.

Underlying each input column, typified by column P–1, FIG. 1a, is a narrow stepped plate 180, adapted to be reciprocated through suitable mechanism by the cyclic rotation of the camshaft 176 to thrust the lowest article in each colum forward into what may be termed "pick-off" position as illustrated, where each article is engaged from above by a suction cup 181. Each individual chute 179, together with its slider plate 180 and actuating mechanism thereof, is adjustable both vertically and horizontally to accommodate differing settings of the suction cups, as hereinafter set forth. The six suction cups of each feeding unit are mounted on a carriage 182 which is slidable horizontally on guide rods 183 and also movable vertically, these combined motions being provided via suitable linkage from the camshaft 176. The carriage 182 also has mounted thereon a vacuum manifold 184 connected by flexible tubes 185 to the suction cups 181. The manifold 184 is also connected to any suitable source of vacuum which may be of low degree but high volume, via a flexible tube and a control valve operated by the camshaft 176, these well-known elements being not shown in order to avoid unnecesary complication of the drawings.

Feed unit 101–2 is the same in general structure as the unit 101–1, as previously noted, except that the row of infeed columns of the articles P–9, P–10, P–11 and P–12 is spaced rearwardly (in the assembly line sequence, FIG. 1a) of the columns P–7 and P–8, and that the latter two columns are aligned with the path of the outer half of the bucket 114.

In operation, all the suction cups of each particular feed unit engage and grasp their respective product articles P presented by the slide plates 180. The carriage 182 is moved forward and downward, carrying the suction cups and their grasped articles P into overlying registry with an aligned pair of first and second series buckets 114 and 123, the carriage's forward motion being in timed synchronism with that of the buckets. At this point the cups release the articles, thereby depositing the latter in the buckets.

Typical relationships between the buckets and various cups during deposit are illustrated in FIGS. 9, 10, 11 and 12. For deposit in the liner 165 within the series one bucket, the cups 181 face squarely downward as shown in FIG. 9. The same squarely face-down drop arrangement is employed to effect stacking against either of the inner slopes 159 or 161 of the open bucket 123, as illustrated in FIG. 10. For stacking on the outer slopes 158 and 160 of the bucket's V-troughs or side members 148 and 150 (FIG. 5), the cups 181 are mounted on their carriages by means of swivel mechanisms, bringing the cups into angular dropping positions in which the planes of the released articles normally are already parallel with the planes of their particular receiving surfaces as illustrated in FIGS. 12 and 11, whether the receiving surfaces be those of the bucket slopes themselves or those of articles previously deposited thereon. This provision prevents the possible escape of an article from the bucket, in case of any occasional irregular release due to unusual variation in the surface contour of the particular article being dropped.

To maintain proper vertical dropping clearance as stacks of articles are built up by successive feed units, the dropping face positions of the delivery cups are set progressively higher in the successive units, the upward adjustment being diagonal in the case of the tipped cups to preserve parallelism in their particular stacking planes. The progressive adjustment of the dropping points may be accomplished by shifts in the mountings of the various cups on their respective carriages, or if desired, the cups themselves (which are preferably of rigid material) may be constructed with differing cylindrical depths; with the latter construction, the depths of the first set of cups, serving the feeder unit 101–1, obviously will be substantially greater than those shown for general operational illustration in FIGS. 9, 10, 11 and 12. In each case, the previously noted positional adjustability of the input chutes 179 and their related parts provides for accurate pick-off of articles by the feeder cups 181. The progressive positional adjustment of the cups permits the dropping distance to be minimized throughout the stacking process; the typical maximum fall in the present embodiment is about five-eighths of an inch, a drop too small to cause breakage of even the most fragile wafer.

While for simplicity in explanatory illustration the majority of the articles P are represented as circular, obviously they may be of any other shape such as square, hexagonal, etc., so long as their dimensions are such as to fit them properly into the desired assortments. To illustrate this point, the articles P–4, P–8 and P–12 are shown as square throughout FIGS. 1a, b, c and d. In a typical assembling operation, the first feeding unit 100–1 deposits the articles P–1 and P–2 in the lined bucket 114, and the articles P–3, P–4, P–5 and P–6 in the leading trough portion 148 of the bucket 123, as shown in FIG. 3c. As the aligned buckets move through the second feeding unit 101–2, the articles P–7 and P–8 are deposited in the lined bucket 114, while the articles P–9, P–10, P–11 and P–12 are placed in the trailing V-trough or side member 150 of the bucket 123. Thus the passage of the aligned buckets through the first pair of feeding units lays the foundations of twelve product stacks per pair of aligned buckets as shown in FIG. 3d.

As the buckets pass through the subsequent feeding units 101–3, 101–4, etc., additional articles are deposited directly in the same manner on the ones already placed, so that as the pair of buckets emerges from the final feeder unit 101–10, FIG. 1c, they contain twelve stacks of five articles per stack, as shown in FIG. 3c. It will be noted that the stacks P–4 and P–12 are disposed with their bases against the outer wings of the bucket's V-shaped side members of troughs 148 and 150 respectively, while the other stacks are based against the inner slopes of the troughs. This example illustrates one of the principal advantages of the present invention, namely its ability to include automatically in each outer row of product stacks at least one stack built up in the right angular or crosscross stacking plane relationship with its neighbors, thereby affording an inherent factor of mutual support and lateral stability in each such row. Obviously, if desired, the apparatus may be adapted similarly to deposit two such stacks in each row in the above noted crisscross relationship to the other stacks therein, appropriate combinations of the depositing arrangements shown in FIGS. 9 through 12 being employed.

TRANSVERSE ASSEMBLY SECTION

Referring to FIGS. 1c and 2c, the section assembly 102 includes a pair of relatively short chains 186 running on driving sprockets 187 and rear or take-up sprockets 188. This chain system is disposed laterally between the first and second pairs of bucket series chains 113 and 122, FIG. 1c, and its drive sprockets 187 are on the same shaft 189 and are of the same size as the series one sprockets 115; hence the chains 186 travel at the same speed as conveyor chains 113, which speed is also the same as that of the second bucket series chains 122. The chains 186 carry a series of open ended transfer or guide troughs 190 having their near end sides 191 flared as indicated in FIG. 3f. The troughs 190 are so spaced on their chains that as two aligned buckets 114 and 123 move into the station a trough 190 takes its place in alignment between them, as illustrated in FIG. 3f. It will be understood that while for purposes of clarity the parts in FIG. 3f are presented in "exploded" view, their actual lateral relationship is substantially that shown in FIG. 13.

An upper cross shaft 192, driven via gear 193 meshing with the previously noted gear 119, has secured thereon a widely spaced pair of sprockets 194 which carry chains 195 extending to rear or take-up sprockets 196. Pairs of spaced cross rods 197, indicated in FIG. 1c, are supported at their ends by the chains 195 in flight relation. Each pair of rods has slidably mounted thereon a pusher 198 which extends downward when it is carried along the lower reaches of the chains 195, as shown in FIG. 2c. A guide rail 199, shown fragmentally in FIG. 1c, is adapted to direct the downwardly extending pushers diagonally across the paths of the aligned buckets 114 and guide troughs 190 in the directional locus 200. The speed of the pusher chains 195 is the same as that of the main bucket conveyors; hence in the diagonal travel of the pushers they remain in longitudinal step with the buckets. The timed relational setting between the parts is such that as each loaded pair of buckets and their intermediate guide trough 190 move into the section 102, a pusher 198 is aligned with the open end of the first series bucket 114, as shown in FIG. 13. In operation, as the combination continues its constant forward progress through the section, the above described cross motion of the pusher 198 causes it to push the liner 165 and its contained product stacks through the guide trough 190 and into position in the middle of the series two bucket 123, as shown in FIG. 3f, the latter bucket 123 now containing all three rows of product stacks. As the open bucket 123 continues its progress toward the outlet end of the section 102 its closing roller 153 over-rides a rail 201 which is formed with an upward jog 202. When a roller 153 encounters this jog, the roller is cammed upward, swinging the bucket side portions 148 and 150 upward into their closed position shown in dot and dash lines in FIG. 6, and thereby confining the liner 165 and its contained row of stacks closely between the outer stack rows. Thus the prime assembly of all twelve stacks of articles is brought about in the bucket 123 as illustrated in FIG. 3j, the assembly having been completed approximately in the production region correspondingly indicated by the arrow 3j, FIG. 2c. It will have been observed that during the process of prime assembly, in the present example including sixty individual product articles, the cross feeding requirement has been limited to the single lateral transfer operation provided in section 102. Obviously no such result could be accomplished by any means shown or suggested in the previously discussed prior art. Incidentally, the advantageous crisscross arrangement of adjacent product stacks, for example stacks P–104 and P–105, is further illustrated in FIG. 6.

The section 102 also includes a pair of sprockets 203 carrying a third pair of main conveyor chains 204 which extend throughout substantially the entire remainder of the production line to a pair of drive sprockets 205 on a shaft 206 in the final section 105, FIGS. 1d and 2d; the drive for the shaft 206 is derived from the line shaft 106 via a worm-gear unit 207, and spur gears 208, 209 and 210. Referring back to FIGS. 1c and 2c, the chains 204 carry a succession of bucket 211, hereinafter termed the series three buckets. These buckets 211 are of the same general open trough construction as the series one buckets 114, but differ from the latter in certain particulars, i.e., they are of the greater width necessary to accommodate the outer carton tray blanks 212, FIG. 3g, their sides are substantially vertical instead of flared, and their upward blank aligner extension or lip 213 is disposed on the leading rather than the trailing edge of the bucket, as shown in FIG. 3h. A further detail difference is the provision of small downwardly extending pads 214 on both ends of the bucket 211, these pads acting as backers in the subsequent past applying operation.

To supply the tray blanks 212 to the series three buckets 211, the station 102 also includes an infeed hopper unit 215, a vacuum pick-off unit 216, and a ram unit 217. Except for dimensional differences, these units are the same as the corresponding blank handling units in section 100 (FIG. 1a), and operate in the same manner, similarly deriving their motivations via suitable intermediate mechanisms from a set of cams 218 on a shaft 219. Since as previously noted, such connecting mechanisms per se are well known, their inclusion herein is represented by the indicating lines 220. The camshaft 219 is driven through a spur gear 221 meshing with the previously noted gear 118. Due to the fact that the operational starting zone of the series three buckets (i.e., the zone of the chains 204 on the sprockets 203) is spaced forwardly of the vacuum pick-off unit 216, a small conveyor 222 is provided to move the dropped blanks forward into place on the buckets 211, as the latter move into registry with the ram unit 217.

The tray blanks 212 are formed in the flat as shown in FIG. 3g, namely with a center flap 223 and side tabs 224 on both ends. When the blanks are ensconsed in the buckets 211 by the ram 217 the flaps 223 and the side tabs 224 protrude from both the front and rear ends of the buckets, as illustrated in FIG. 3h.

It will be seen that in the section 102 (FIG. 2c) the number three bucket series chains 204 are spaced on a level substantially above that of the number two series chains 122. To bring two sets of buckets to the same level in the subsequent section 103, the number two chains 122, upon their emergence from section 102 move at an upward slant, their path being determined by the usual guide rails (not shown). Due to this upward slant, the sloping travel of the series two buckets 123 is slightly greater linearly than that of the series three buckets 211. To compensate for this difference, and since the velocity of both sets of chains is the same, the buckets 211 emerge from the section 102 in a linear position slightly rearward of that of the related buckets 123, as shown in FIG. 1c; by this provision, the corresponding pairs of buckets move into accurate alignment in the section 103, as hereinafter set forth. At this juncture it is appropriate to note that in FIG. 1c, which as previously stated is largely a diagrammatic rather than strict dimensional illustration of the operating sequence, a clear showing of the operating relations within the confines of the patent drawing sheet has made it necessary to show the path of the series three buckets as closer to that of the number series than is physically the case; while this requirement could appear to make the lateral extent of the buckets themselves in FIG. 1c as less than the lengths of the stack rows to be accommodated thereby, it will of course be understood that in actuality the bucket widths are sufficient to contain the complete rows of stacks as indicated in the perspective views 3e, 3f and in FIGS. 13 and 14.

TRAY LOADING SECTION

As the series three buckets 211 are conveyed horizontally from station 102 to station 103, FIG. 2c, they run betwen side-rails 225 which intercept the tray flaps 223 and deflect them downward into the position illustrated in FIG. 3j. In this process the lower edges of the side-tabs 224 necessarily are also briefly intercepted by the upwardly curved noses of the rails 225 but are shortly released thereby so that the tabs 225 spring outward again. Shortly thereafter the loaded bucket 123, in its upward progress, moves between the tray side-tabs 224 into transverse registry with the series three bucket 211, as shown in FIG. 14.

Located in the section 103 so as to overhang the paths of pairs of buckets 123 and 211 is a cross pusher mechanism 226 generally similar to that previously noted in station 102, based on chains 227 which are driven by sprockets 228 (FIGS. 1d and 2d) on a cross shaft 229. The shaft 229 receives its drive through the gears 230, 231, 232, 233 and worm-gear unit 234 from the line shaft 106. The cross pushers 235 of the mechanism are of width sufficient to engage all three rows of product stacks carried by the bucket 123. The pusher mechanism 226 also includes a succession of backing plates 236. As the pushers 235 move downward into lateral front alignment with the loaded series two bucket 123 and its companion series three bucket 211, the backing plates 236 similarly move into laterally rearward alignment with the pair of buckets. At this point the pushers and backing plates are laterally remote from the bucket combination, as indicated by the directional lines 237 and 238 which represent diagrammatically the respective paths of the pushers and backers. As the combination moves forward at the continuous speed of the main conveyor system, the pusher 235 and backing plate 236 (directed by their respective guide rails, not shown) converge on the series two bucket 123 until they reach the relative positions shown in FIG. 14, in which the pusher 235 engages the assembly of product stacks P, while the backing plate 236 is located rearwardly of the product assembly with a normal clearance too small to appear significantly in FIG. 14 but sufficient to prevent any possible squeezing of the product stacks. From this juncture the pusher and backer are moved transversely rearward in concert (FIGS. 1c and 1d), thus conducting the stack assembly into the tray 223 as illustrated in "exploded" relation in FIG. 3j. The presence of the backer plate prevents any possible transverse coast or over-travel of the product stacks due to the relatively high speed of the apparatus. From this point the series three bucket 211 emerges from the station 103, carrying the loaded tray 212 with its side tabs 224 projecting outwardly as indicated in FIG. 1d. It will further be understood that, as shown in FIG. 1a, the adjacent product articles P are introduced (and accordingly placed in the buckets) with a small lateral spacing, due to the intermediate presence of their infeed chute walls, and in order to assure deposit in the buckets without possible interference. These initial spacings, which are too small to appear in the perspective views, are automatically closed by action of the described first and second cross assembly mechanisms, so that the product stacks arrive in the tray 212 in snugly packed condition.

SEALING STATION

As the bucket 211 enters the sealing station 104 (FIGS. 1d and 2d), a pair of thin backing fins 237, carried on overhead chains 238, move into positions in the front and rear ends of the loaded tray 212 just laterally clear of the stack product assembly between them. The forward progress of the bucket 211 causes the leading side tabs 224 of the tray 212 to encounter flared side rails 239 which deflect them inward, while a rotary arm or star wheel member 240 similarly strikes the trailing side tabs inward, so that both pairs of front and rear tabs are "broken" or hinged inward against the outer faces of the backing fins 237 as illustrated in FIG. 3k. During and immediately following this process, which occurs in the zone generally indicated by the zonal arrow 3k, FIG. 2d, the loaded tray 212 is carried through an adhesive applier device 241 of any suitable type, including applicator rollers 242. The rollers 242 apply dabs of adhesive 243 as also shown in FIG. 3k.

In the continued progress of the tray 212 the flaps 223, due to resilience at their hinging lines, spring outward as they are released by the applicator rollers 242. The flaps, carrying the dabs 243, are engaged by upwardly tapering deflectors 244 which swing them upward into closing adhesive engagement with the side tabs 224, the latter being backed by the previously noted fins 237. From the deflectors 244 the tray 212, still carried by its containing bucket 211, passes between resilient squeezer belts 245 which complete the firm adhesive sealing of the end flaps to the side tabs, so that the assembly is firmly sealed in its final condition illustrated in FIG. 3l. As the bucket 211 and its contained tray 212 continue their progress, the thin backing fins 237 are withdrawn upward by their chains 238, FIG. 2d.

DISCHARGE SECTION

Section 105, in addition to the previously noted driving sprockets 205 of the third bucket system, includes a discharge pusher mechanism 246, driven via gears 247 and 248, from the shaft 206, FIG. 1d. There sprockets 249, 250 and 251 carry a horizontal chain 252 to which are attached successive pushers 253. The active reach of the chain 252 carries the pushers 253 diagonally across the path of the loaded buckets 211, the leftward component of the diagonal motion and the mutual timing being such as to place each pusher 253 in transverse alignment with a cooperative bucket 211. Accordingly, as each pusher travels laterally through a bucket 211 it ejects the loaded and sealed tray 212 therefrom and delivers it to final wrapping apparatus 254 of any suitable type.

Throughout the entire production line operation described, it will have been observed that nowhere are the individual product articles subjected to any mchanical distortion and consequent danger of breakage. This advantage is typified in the primary pick-off and deposit of the articles in the successive feed units, wherein, as previously stated, the cups 181 are preferably of rigid construction and supplied with vacuum of relatively low degree but high volume. As a result of this provision, the cups do not flex to seal tightly to the articles so as possibly to distort them and/or delay release; the high volume suction, while holding the articles accurately in position on the cups, allows inward leakage among surface irregularities on the articles, thus relieving the latter of possible destructive stresses.

From the foregoing description, it will be seen that the invention provides automatic means to assemble relatively large packaged assortments of food articles at high speed with maximum gentleness in handling, and with ability to arrange adjacent stacks at differing base angles for mutual support and convenience; obviously, these new and useful results could not be accomplished by any combination disclosed or suggested in the previously discussed prior art.

In the typical embodiment described herein, the apparatus has been illustrated as assembling an assortment of sixty articles in twelve stacks of five similar articles each. However, the device obviously is adapted to various other feeding combinations, dependent on the particular assortment desired. For instance, instead of a five article stack the desired assortment may call for a three unit stack of somewhat thicker articles such as cookie sandwiches or the like. In such an arrangement, three of the five vacuum cup and in-feed chute combinations serving the particular stack location may be adjusted to accomodate the thicker articles, while the remaining two are disabled by the simple expedient of supplying no articles to their input chutes; the idle vacuum cups may be plugged to avoid unnecessary loss of vacuum.

As a further extreme example of the device's applicational flexibility, it will also be evident that if it is desired to supply an assortment of more than twelve varieties of different but similarly dimensioned articles dispersed in the twelve stacks illustrated, the present embodiment permits any such dispersal up to sixty different varieties, this object being accomplished by initially supplying such articles to the various in-feed chutes. Finally, if the production for which the device is required calls for maximum stacks of either more or less than the typical five article stacks illustrated, the number of feeding units 101 included in the assembly may be increased or diminished accordingly. Thus, while the invention has been set forth in typical preferred form, it is not limited to the precise embodiment illustrated, as various modifications may be made without departing from the spirit of the invention within the scope of the appended claims.

What is claimed is:

1. In assortment assembling apparatus, in combination, linear conveying means, means to drive said conveying means, a plurality of receiving buckets arranged in a succession of cooperative pairs on said conveying means, each of said pairs comprising a first series bucket and a second series bucket in transverse alignment, feeding means to establish a plurality of stacks of generally flat food articles in transversely extending rows in said first and second series buckets, said feeding means including independently operating means to effect establishing of selected ones of said stacks with the planes of the articles therein directed substantially at right angles to the planes of the articles in the stacks adjacent said selected stacks, and laterally operable means to transfer said rows of stacks established in said first series buckets to their respective second series buckets to form multi-row assemblies with said rows of stacks established in said second series buckets.

2. Apparatus according to claim 1 including a third series of buckets carried by said conveying means and associated in transverse alignment each to each with said second series buckets, means to deposit in each of said third series buckets a normally open ended carton tray containing one of said multi-row assemblies, transversely operable means to move each of said assemblies bodily from its second series bucket to said tray in said associated third series bucket, and means to end-close and seal said carton trays containing said assemblies.

3. Apparatus according to claim 1 in which said feeding means includes a plurality of feeding units arranged successively along the path of said conveying means to deposit a plurality of selected individual food articles simultaneously in predetermined stacking locations in said receiving buckets.

4. Apparatus according to claim 3 wherein each of said feeding units includes individual means to present each of said selected individual articles in pickup position, and means including vacuum cups movable to grasp said presented articles in said pickup positions and to transfer said articles to said respective predetermined locations in said receiving buckets.

5. Apparatus according to claim 1 wherein each of said first series buckets comprises a trough-shaped body to contain a single row of said stacks, and wherein each of said second series buckets comprises a normally empty middle portion and trough-shaped flanking portions to contain rows of said stacks established therein, said middle portion being aligned with said associated first series bucket to receive said single row of stacks transferred from said associated first series bucket.

6. Apparatus according to claim 5 including means to insert a liner in each of said first series buckets, said liner being adapted to contain directly said row of product article stacks established in said first series bucket by said feeding means, and wherein said lateral transfer means is adapted to transfer said liner and said contained row of stacks bodily into said associated second series bucket.

7. Apparatus according to claim 5 wherein said trough shaped flanking portions of each of said second series buckets are hinged with respect to said middle portion thereof, said flanking portions being normally disposed in upwardly open through position to accommodate said establishment of said rows of stacks therein by said feeding means, and means to swing said hinged flanking portions upwardly and inwardly to bring their deposited rows of product stacks into engagement with said liner containing said transferred middle row of stacks.

8. In apparatus for forming an assortment assembly of a variety of differing flat food articles, in combination, means to receive said articles, independently operating means to accumulate in said receiving means an individual stack of each type of said articles in said variety, said accumulating means including independently operating means to establish selected ones of said stacks with the planes of the articles therein directed substantially at right angles to the planes of the articles in stacks adjacent said selected stacks, and independently operating means to move said stacks into closely packed relationship to complete said assortment assembly.

9. Apparatus according to claim 2 including means to discharge said loaded and sealed carton trays from said third series buckets.

References Cited

UNITED STATES PATENTS

| | | | |
|---|---|---|---|
| Re. 26,357 | 3/1968 | Griner | 53—159 X |
| 2,031,949 | 2/1936 | Hartman | 53—159 X |
| 2,642,212 | 6/1953 | Currivan | 53—252 |
| 2,689,636 | 9/1954 | Currivan | 53—252 X |
| 2,822,651 | 2/1958 | Mayer | 53—252 X |
| 2,834,165 | 5/1958 | Bonebrake | 53—252 X |
| 2,941,341 | 6/1960 | Clinton | 53—240 X |
| 2,982,078 | 5/1961 | Morton | 53—167 X |
| 3,095,960 | 7/1963 | Luginbuhl | 198—30 |
| 3,177,630 | 4/1965 | Jun | 53—240 |
| 3,191,749 | 6/1965 | Hawley | 198—30 |
| 3,191,751 | 6/1965 | Griner | 198—35 |
| 3,238,695 | 3/1966 | Dugle | 53—252 X |
| 3,250,376 | 5/1966 | Griner | 198—35 |
| 3,339,335 | 9/1967 | Bowden | 53—252 X |
| 3,389,531 | 6/1968 | Ehe | 53—159 X |
| 3,402,524 | 9/1968 | Griner | 53—159 |
| 3,412,843 | 11/1968 | Maulini | 198—35 |
| 3,444,982 | 5/1969 | Greiner | 53—155 X |

FOREIGN PATENTS 489,079   12/1952   Canada.

WAYNE A. MORSE, JR., Primary Examiner

U.S. Cl. X.R.

53—157, 159, 175, 238, 252